Figure 1:
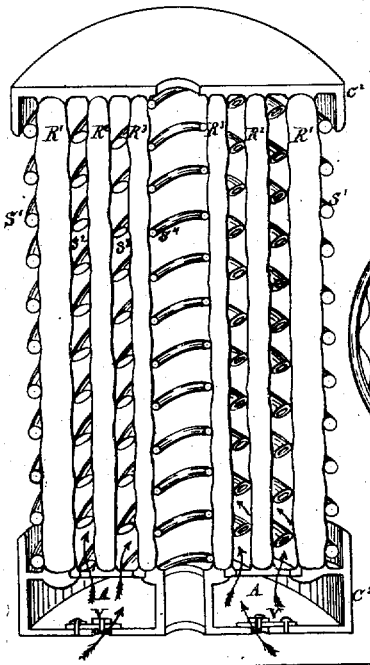

E. T. BUSSELL.

Improvement in Car Springs.

No. 4,767. Reissued Feb. 27, 1872.

*Witnesses*

Chas. B. Nottingham.

J. R. Nottingham

*Inventor.*

Erastus T. Bussell by atty A. Pollok

UNITED STATES PATENT OFFICE.

ERASTUS T. BUSSELL, OF INDIANAPOLIS, INDIANA, ASSIGNOR TO THE UNION CAR-SPRING COMPANY.

IMPROVEMENT IN CAR-SPRINSS.

Specification forming part of Letters Patent No. 84,258, dated November 24, 1868; reissue No. 4,767, dated February 27, 1872.

*To all whom it may concern:*

Be it known that I, ERASTUS T. BUSSELL, of Indianapolis, in the county of Marion and State of Indiana, have invented certain new and useful Improvements in Springs for Railway Cars and like purposes, of which the following is a specification:

My invention relates to springs for railway cars and like purposes, which are composed partly of vulcanized India rubber and partly of metal; and its object is to produce a spring of the kind referred to which shall be effective in its action and cheaper and better than springs of the same general composition heretofore in use.

My invention may be stated in general terms to consist: First, in the combination of a hollow India-rubber cylinder with an external metallic spiral spring and an air-space within said cylinder, which is closed so as to confine the air when pressure is applied to the end of the cylinder or spring. By this means, while employing an external metallic spiral to support the rubber cylinder and afford increased resiliency, I also avail myself of the elasticity and resistance of the air confined within the cylinder while the spring is under pressure to render the spring still more elastic, and, at the same time, by reason of the space within the hollow cylinder, make provision for the internal expansion or spreading of the rubber when it is under pressure. Second, it also consists in the combination, with the elements named in the preceding clause, of an internal metallic spiral spring, supporting the cylinder on the inside. This feature is of value when the rubber tube or hollow cylinder is made of little thickness, or with walls comparatively thin, inasmuch as the internal spiral upholds the cylinder, and, in conjunction with the confined air, gives to it increased capacity for resistance. Third, it also consists in the combination of a series of hollow rubber cylinders and external metallic spiral springs, arranged in nest, with top and bottom caps or plates for closing the air-spaces within such nest-spring, substantially as hereinafter described, whereby a strong, compact, and durable spring is obtained. Fourth, it also consists in the combination, with a single spring or a nest-spring, such as above described, of an air-chamber, located in one of the caps, which close the ends of the same, and provided with valves and openings, arranged substantially as hereinafter described, so that the vibratory movement of the cars when in motion will cause air to be pumped in, as it were, into the interior of the spring.

To enable others skilled in the art to understand and use my invention, I have represented in the accompanying drawing, which I shall now proceed to describe, a spring combining all the improved features recited in the foregoing statement of the nature of my invention.

Figure 4:
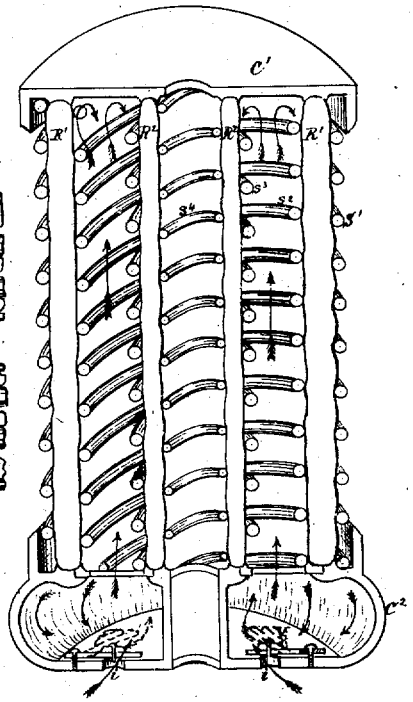
Figure 5:
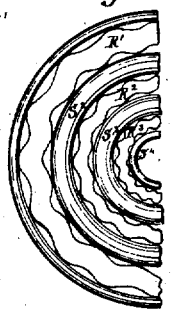
Figure 2:
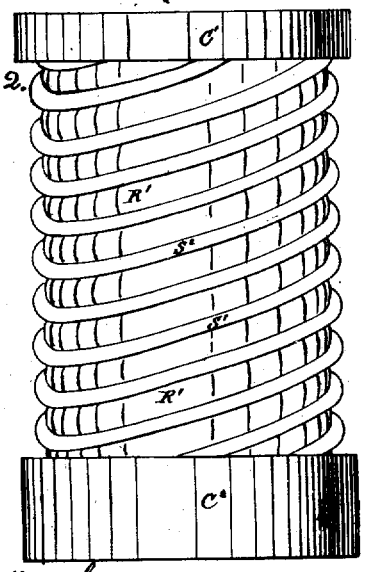
Figure 3:
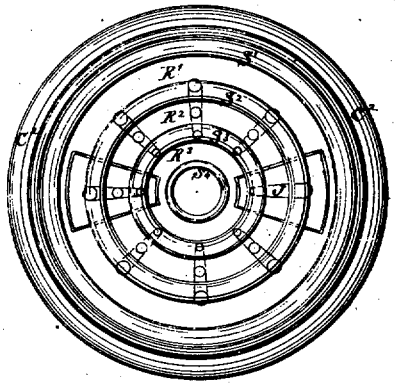

In the drawing, Figure 1 represents a vertical central section of said spring, Fig. 2 is an elevation, and Fig. 3 is a plan of the same. Fig. 4 is a vertical central section of a modified form of the spring. Fig. 5 is a horizontal half-section of a rubber nest-spring with a modified form of rubber cylinder.

The nest-spring, in Fig. 1, is composed of a series of springs, consisting of hollow rubber cylinders $R^1$ $R^2$ $R^2$ provided with external metallic spiral springs $S^1$ $S^2$ $S^3$, fitting and surrounding the exterior of their respective cylinders of rubber; the spring being provided with means for confining the air within it, which means consists, in the present instance, of top and bottom plates or caps $C^1$ $C^2$, which, when pressed together, prevent the air within the spring from escaping, so that the air thus confined will increase the resistant capacity and resiliency of the spring.

The combination of a hollow vulcanized India-rubber cylinder, with a surrounding metallic spiral spring and means for confining the air within the cylinder when the latter is under compression, (the only time at which the air needs to be so confined,) is productive of an improved spring, embracing elements not before used in this combination, the conjoined action of the air, rubber, and metal imparting greater elasticity and resistance to the spring, as above stated, while the space within the hollow cylinder allows the rubber, when compressed, to spread laterally toward the center or interior of the spring, thus rendering unnecessary the external longitudinal flutes claimed in my patent of November 29, 1853; and when a series of such springs are placed together in nest, as described, a compound or nest-spring of great compactness and durability is obtained.

In case a thin rubber tube or hollow cylinder is used in connection with an external metallic spiral and end plates or caps for confining the air within the tube when the latter is under pressure, it may be found desirable to give increased internal support to the tube over that afforded by the air, and in this case I combine with the elements above named an internal metallic spiral, as indicated in Fig. 4, where I have shown two such internally and externally supported hollow rubber cylinders arranged in nest with top and bottom caps or plates, which serve to confine the air in the space between the rubber tubes.

In arranging the springs in the nest form, shown in Fig. 1, I place the spiral and rubber tubes or hollow cylinders within one another alternately in succession; each spiral being upon the exterior of its respective rubber cylinder, and an internal spiral, $S^4$, being provided for the innermost rubber cylinder, whenever, as in the present instance, the compound spring is arranged to receive a bolt through its center. Between each two springs there is a space into which air passes, as indicated by the arrows. The rubber cylinders and metallic spirals are, of course, cut of the same length. Upon the interior opposite faces of the top and bottom caps or plates $C^1$ $C^2$ I prefer to form annular grooves to receive and compress the ends of the rubber cylinders, so as to make tight joints to prevent escape of air when the spring is compressed. In connection with either a single spring of the kind described, or a series of such springs placed in nest, I can employ a chamber, A, in one of the caps—the lower cap $C^2$, in this instance—communicating with the air-space or spaces in the springs through openings formed in the cap, as shown, and provided at its bottom with openings *i*, closed by common clack-valves V, that prevent the air from escaping through said openings, but allow air to enter or be pumped into the chamber A by the vibrations of the car when moving. When the whole spring is shortened under pressure the confined air reacts upon the body of air in chamber A, thus greatly increasing the elasticity of the spring.

The contemplated corrugation of the hollow rubber cylinders, represented in Fig. 5, is intended on the score of economy chiefly, inasmuch as this form stiffens the walls of the cylinders, enabling the manufacturer to effect a saving of material by making them lighter than if they were plain or smooth, and, at the same time, it increases the capacity of the air-spaces between the cylinders, which will be of advantage when the springs are arranged close together in nest.

Another method of enlarging these air-spaces, when the cylinders are so arranged, is to make the spirals $S^2$ $S^3$ of flattened wire or rods and coil them edgewise.

Having described my invention and the manner in which the same is or may be carried into effect, I would state, in conclusion, that I do not claim the combination of metallic spiral springs with and placed within hollow springs made of metal or vulcanized India rubber as described and claimed in the patent of F. M. Ray, of March 27, 1849; but

What I claim as my invention, and desire to secure by Letters Patent, is as follows:

1. The combination of a hollow vulcanized India-rubber cylinder with an external metallic spiral spring and an air-space within said cylinder, which, when the cylinder or spring is under pressure, is closed against the escape of the air contained therein, substantially as herein shown and described.

2. In combination with the elements named in the preceding clause, a metallic spiral spring, arranged within the rubber cylinder and so as to give it increased internal support, substantially as herein shown and described.

3. The combination of a series of springs, substantially such as above described, arranged in nest, substantially in the manner shown and set forth.

4. The combination, with a single spring or a compound or nest-spring, as described, of top and bottom caps or plates to close the air-space or spaces within said spring, substantially as shown and set forth.

5. The combination, with a single spring or compound or nest-spring provided with top and bottom caps, as described, of an air-chamber, located in one of said caps and provided with openings and valves, operating substantially in the manner shown and set forth.

In testimony whereof I have signed my name to this specification before two subscribing witnesses.

ERASTUS T. BUSSELL.

Witnesses:
M. BAILEY,
A. POLLOK.